(12) United States Patent
Ryham et al.

(10) Patent No.: US 6,217,711 B1
(45) Date of Patent: Apr. 17, 2001

(54) METHOD OF TREATING CONDENSATES

(75) Inventors: Rolf Ryham; Jarmo Kaila; John Rauscher, all of Alpharetta; Theodora Retsina, Atlanta; Jan Ohman, Alpharetta, all of GA (US)

(73) Assignee: Andritz-Ahlstrom Oy (FI)

( * ) Notice: Subject to any disclaimer, the term of this patent is extended or adjusted under 35 U.S.C. 154(b) by 0 days.

(21) Appl. No.: 09/248,006

(22) Filed: Feb. 10, 1999

Related U.S. Application Data

(60) Provisional application No. 60/074,305, filed on Feb. 11, 1998.

(51) Int. Cl.[7] .............................. B01D 1/28; B01D 3/38; D21C 11/10; D21C 11/06
(52) U.S. Cl. .................. 203/26; 159/24.1; 159/16.3; 159/47.3; 162/29; 162/46; 162/47; 162/68; 162/77; 203/27; 203/79; 203/DIG. 8; 203/DIG. 23
(58) Field of Search .................................. 203/4, 26, 27, 203/89, 91–98, 79, DIG. 23, DIG. 8, DIG. 9; 159/16.3, 24.1, 49, 47.3; 162/68, 77, 47, 46, 30.11, 30.1, 29; 202/173, 176, 202, 182

(56) References Cited

U.S. PATENT DOCUMENTS

| | | | |
|---|---|---|---|
| 3,807,479 | * | 4/1974 | Brannland et al. ............ 49/47.3 |
| 4,100,016 | * | 7/1978 | Diebold et al. .................. 162/29 |
| 5,139,620 | * | 8/1992 | Elmore et al. .................... 203/26 |
| 5,830,314 | * | 11/1998 | Mattsson ........................ 202/174 |

OTHER PUBLICATIONS

Beder, H., Madrid, L., Tappi, vol. 60, No. 9, Sep. 1977, pp. 94–97.
Pu, Q., Messmer, R., Smith, L., Caron, A.L. "Steam Stripping of Kraft Foul Condensates to Reduce TRS and BOD", TAPPI International Environmental Conference Proceedings, 1994, Book 2, pp. 863–872.

* cited by examiner

*Primary Examiner*—Virgina Manoharan
(74) *Attorney, Agent, or Firm*—Nixon & Vanderhye P.C.

(57) ABSTRACT

A method of treating cellulose pulp mill condensates having an MeOH content using an evaporator and a steam stripper having a reboiler, comprising: (a) Collecting a feed liquor stream having at least 50% of the pulp mill MeOH. (b) Feeding the feed liquor stream to the evaporator having at least two heating element sections separated on a motive steam side. (c) Evaporating the liquor in the evaporator to produce a vapor containing at least 40% of the at least 50% of the pulp mill MeOH. (d) Compressing the vapor from (c) to increase the vapor pressure. (e) Using the vapor from (d) as condensing heating media in (c) for the evaporation in a first heating element section of the evaporator and venting a portion of the vapor through the first heating element section. (f) Compressing the vented vapor from the heating elements of the evaporator from (e) to increase the vapor pressure to be used as heating media in the reboiler. (g) Condensing the compressed vapor from (f) in the reboiler while evaporating already stripped condensate fed to the reboiler so that vapor formed in the reboiler flows to stripper. (h) Feeding the condensate from the reboiler and condensate from the evaporator to the stripper column. (i) Causing vapor from (g) to enter the stripper column and to flow upward countercurrent to the condensate from (h), producing an MeOH rich vapor leaving the stripper column. (j) Causing the MeOH rich vapor to enter a second heating element section of the evaporator and condense while evaporating the liquor in (c) producing a condensate entering the stripper in (h). And, (k) venting a portion of the MeOH rich vapor entering the heating element in (j).

8 Claims, 2 Drawing Sheets

METHOD OF TREATING CONDENSATES

CROSS-REFERENCE TO RELATED APPLICATION

This application is based on Provisional Application Ser. No. 60/074,305, filed Feb. 11, 1998, the contents of which are hereby incorporated by reference.

BACKGROUND AND SUMMARY OF THE INVENTION

Sulphate cooking of cellulose pulp produces malodorous organic sulphur compounds, such as methyl mercaptan, dimethyl sulphide and dimethyl disulphide, as the sulphide and hydrogen sulphide ions react with lignin and the methoxyl groups of lignin fragment. Sulphate cooking also produces a large amount of methanol mainly in alkaline hydrolysis of lignin. Large amounts of vapors containing methanol and sulphur compounds are released, e.g., in the evaporation of black liquor, in which the above-mentioned compounds are distilled and condensed into the condensates of a multi-effect evaporation plant. Methanol has a high COD (Chemical Oxygen Demand), and therefore methanol is removed to lower the COD-level.

It has been very important in order to comply with environmental regulations in the United States to deal with the "Cluster Rules" established by the Environmental Protection Agency.

The Cluster Rules basically say that a cellulose pulp mill (e.g. kraft mill) has to collect streams of condensate resulting from the pulping operation containing at least 65% of the HAP's (by EPA defined as MeOH which is a surrogate for real HAP's which might be more than 50 different kinds of components) and to treat these condensates so that 92% of this HAP (MeOH) is removed and destroyed by means of thermal oxidation.

The mill may also elect to show that condensates containing at least 7.2 lb HAP/ODTP for unbleached pulp or 11.1 lb HAP/ODTP for bleached pulp have been collected into a stream(s) which can be treated to remove 6.6 lb HAP/ODTP and 10.2 lb HAP/ODTP, respectively, or to achieve a maximum HAP (MeOH) outlet concentration of 210 ppmv and 330 ppmv, respectively.

In part due to the unique design of a plate type falling film evaporator, such as available from Ahlstrom Recovery, Inc., of Alpharetta, Ga., in combination with low speed steam compression technology and integral steam stripping, it is possible, according to the invention, to provide a one-step solution to comply with the "Cluster Rules", although the invention can also be practiced with other conventional, e.g. tubular, heat transfer surfaces.

Essentially separated from the existing operation, the invention comprises or consists of two sets (sections) of heating elements, separated on the motive steam side with common vapor release. Weak liquor from the pulp mill is evaporated for the first time in a single stage VCE unit, guaranteeing the release of at least 65% of the HAP (MeOH) in the spent pulping liquor.

According to the invention the vapor containing MeOH is compressed in a first compressor and then flows through the main section of the heating elements of the evaporator. A major part (e.g. 80%) of the vapor is condensed in a countercurrent fashion and the rest (e.g. 20%) of the vapor is vented. The vented vapor is compressed in a secondary compressor and fed a stripper reboiler where it is condensed. By this method, at least 80% (e.g. 90%) of the 65% MeOH will end up in the stripper reboiler condensate.

The second section of the heating elements is fed with overhead vapor from the steam stripper which is fed with reboiled stripped condensate produced in a reboiler/evaporator similar to the one previously described. To overcome the additional Δp, the second compressor is used to compress the vapor from the main evaporator/compressor.

The stripper will receive the condensates condensed in the above-described reboiler as well as the condensates from the condensing of digester blow-off vapor, turpentine underflow, and the NCG collection system. By collecting and treating all of these sources, a pulp mill can satisfy the required collection and treatment procedures of the Cluster Rules.

According to the invention a method of treating cellulose pulp mill condensates having a MeOH content is provided, using an evaporator and a steam stripper having a reboiler. The method typically comprises: (a) Collecting a first feed liquor stream having at least about 50% of the pulp mill MeOH (methanol); (b) Feeding the first feed liquor stream to an evaporator having at least two heating element sections separated on the motive steam side; (c) Evaporating the liquor in the evaporator to produce a vapor containing at least about 40% of the at least 50% of the pulp mill MeOH; (d) Compressing the vapor from step (c) to increase the vapor pressure thereof; (e) Using the vapor from step (d) as condensing heating media in step (c) for the evaporation in a first heating element section of the evaporator and venting a portion of the vapor through the first heating element section; (f) Compressing the vented vapor from the heating elements of the evaporator from step (e) to increase the vapor pressure, so as to allow it to be used as heating media in the reboiler; (g) Condensing the compressed vapor from step (f) in the reboiler while evaporating already stripped condensate fed to the reboiler so that vapor formed in the reboiler flows to the stripper; (h) Feeding the condensate from the reboiler and condensate from the evaporator to the stripper column; (i) Causing vapor from step (g) to enter the stripper column and to flow upwards countercurrent to the condensate from step (h), producing an MeOH rich vapor leaving the stripper column; (j) Causing the MeOH rich vapor to enter a second heating element section of the evaporator and condense while evaporating the liquor in step (c) producing a condensate entering the stripper in step (h); and (k)Venting a portion of the MeOH rich vapor entering the heating element in step (j). The method may comprise a further step (l) of leading the MeOH-rich vapor from step (k) to a thermal destruct unit or to a methanol liquefaction plant.

According to one exemplary embodiment of the invention in step (e) the vapor containing MeOH is condensed in a countercurrent fashion in a two-stage heating element section to produce a small stream of condensate with high HAP (MeOH) content (e.g. >90% of the HAP's) to be fed to the stripper and a large stream (containing e.g. <8% of the HAP's ). The balance of HAP's will be contained in a vent stream from the evaporator.

It is the primary object of the present invention to provide a method that allows a pulp mill to satisfy the required collection and treatment procedures of the Cluster Rules. This and other objects of the invention will become clear from an inspection of the detailed description of the invention and from the appended claims

DETAILED DESCRIPTION OF THE DRAWINGS

Figure 1:
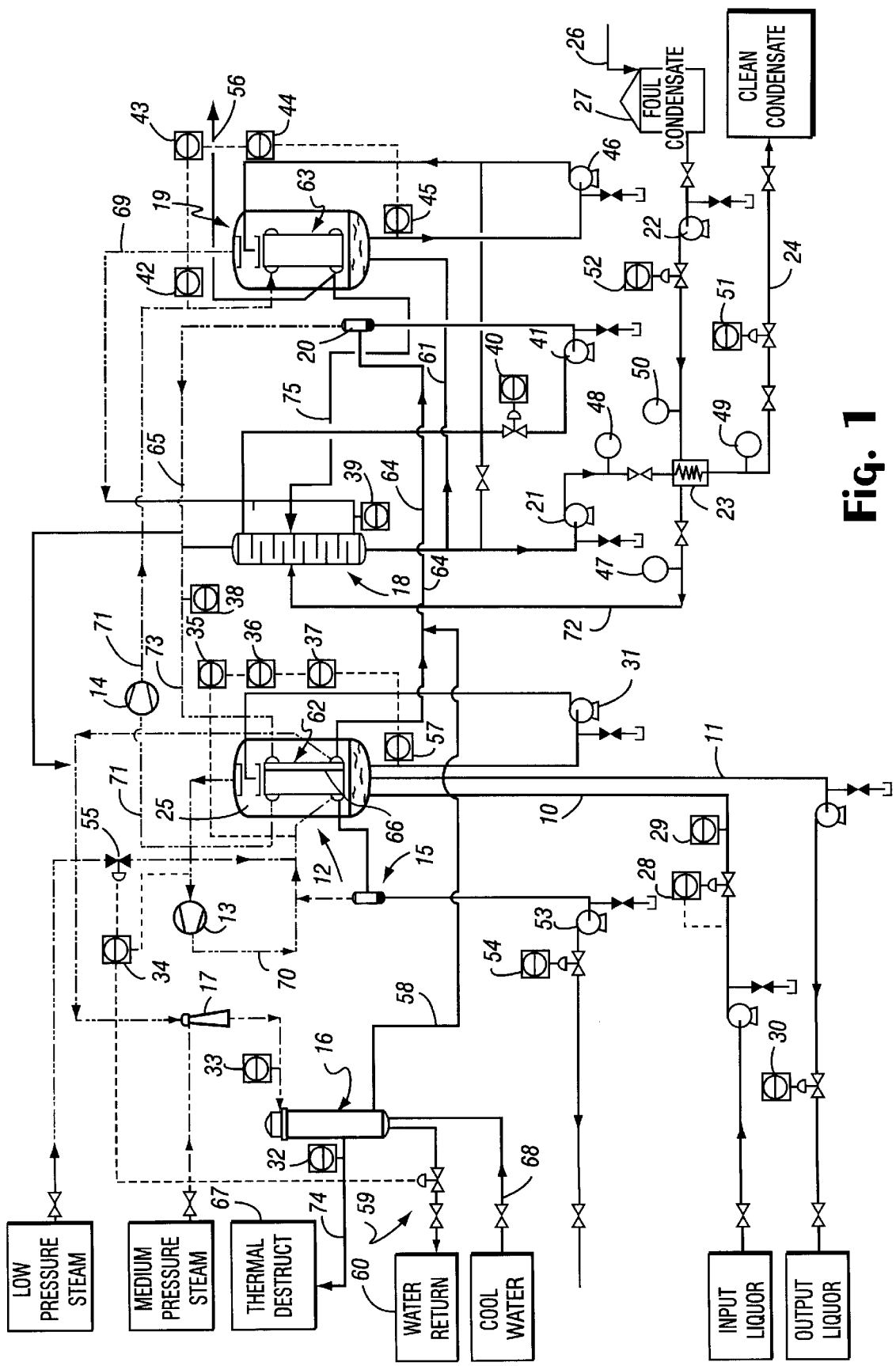
FIG. 1 schematically illustrates one exemplary version of apparatus according to the invention, comprising a flow sheet showing various components of the present invention hooked up to achieve the desired results according to the invention, and practice the method of the invention.

In FIG. 1 the following reference numerals refer to the indicated structures:

Ref. # Structure

10. Feed liquor line containing MeOH rich liquid (e.g. black liquor)
11. Product liquor from pre-evaporator
12. Pre-evaporator
13. No. 1 turbo fan exhausting vapor from the pre-evaporator (e.g. 2800 hp)
14. No. 2 turbo fan exhausting vapor from the pre-evaporator (e.g. 500 hp)
15. Condensate level tank for combined (clean) condensate
16. MeOH/vapor trim condenser (for MeOH content control)
17. MeOH/vapor exhaust ejector
18. Stripping column [e.g., such as shown in Beder et al article "Steam Savings . . . ", Tappi, Vol. 60, No. 9, September, 1977, pp. 94–97]
19. Reboiler
20. Stripper reflux tank for foul condensate
21. Pump withdrawing condensate from stripping column
22. Pump from foul condensate tank
23. Heat exchanger for heating foul condensate from tank 27 using hot condensate from pump 21, in line 24
24. Discharged condensate from stripping column
25. Vapor collection volume at top of pre-evaporator 12
26. Mill condensate input line
27. Foul condensate storage tank
28. Flow controller for feed liquor
29. Temperature indicator
30. Product liquor level control valve (liq. level inside the pre-evaporator 12)
31. Recirculating pump for pre-evaporator 12
32. MeOH/vapor product temperature indicator
33. SOG pressure indicator [SOG=stripper off gas]
34. Evaporator pressure control (for controlling valves 55 and 59)
35. Heating vapor pressure indicator for evaporator
36. Calculated saturation temperature of heating vapor [35]
37. Temperature difference over evaporator heating surface indicator [the temperature at 36 minus the temperature at 57]
38. Stripper 18 top pressure indicator
39. Stripper 18 bottom pressure indicator
40. Foul condensate level tank [20] level control valve
41. Foul condensate level tank [20] pump
42. Reboiler 19 heating vapor pressure indicator
43. Calculated saturation temperature of 42
44. Temperature difference over reboiler heating surface [43–45]
45. Reboiler 19 recirculation temperature indicator
46. Recirculating pump for reboiler 19
47. Stripper 18 foul condensate feed temperature indicator
48. Temperature sensor for stripper discharge [clean cond.]
49. Temperature sensor for stripper discharge [clean] to pulp mill
50. Temperature sensor for stripper foul condensate from storage
51. Stripper 18 level control valve
52. Stripper foul condensate feed flow control
53. Discharge pump for discharging combined condensate
54. Combined condensate tank level control valve
55. Automatically controlled valve for make-up steam
56. Reboiler vent to NCG system
57. Evaporator circulating liquor temperature indicator
58. Foul condensate from trim condenser
59. Automatically controlled valve for cooling water
60. Cooling water return
61. Condensate circulation line from stripper 18 to reboiler 19
62. Dimpled plate falling film heat exchanges in pre-evaporator 12 second section
63. Dimpled plate or tubular falling film heat exchanges in reboiler 19
64. Reflux condensate line
65. Vent vapor discharge line from the reflux tank 20
66. Dimple plate heat exchanger in pre-evaporator 12 first section
67. Conventional thermal destruct unit for the MeOH rich gas stream or Methanol liquefaction plant
68. Cooling water line
69. Boiled off vapor line (from reboiler 19)
70. Vapor line from pre-evaporator 12
71. Main section vent line from pre-evaporator 12
72. Foul condensate line to stripper 18
73. Vapor line from stripper 18 to heating element 62
74. MeOH rich vapor line from condenser 16
75. Condensate line from reboiler 19

The invention combines pre-evaporation and foul condensate stripping into a single integral system.

The pre-evaporator 12 body is a cylindrical vessel preferably equipped with conventional dimpled plate type heat exchange elements 62 (although other conventional heat exchange elements, such as tubular elements, can be used), a liquor distribution system, motive steam and non-condensible gas vent headers, and vane type vapor entrainment separators. The evaporator 12 preferably utilizes Ahlstrom falling film plate technology whereby the heat exchange surface (referred to as heating elements) comprises, for example, two five foot by thirty foot stainless steel dimpled plates welded together along the perimeter. Steam condenses inside the element while liquor flows downward over the outside surface of the element. The required pressure rating and specific volume of the heating steam determines the width and heating element thickness.

Weak feed black liquor from a pulping (e.g. kraft) operation, for example, at 16% dry solids and about 188° F., is pumped from line 10 into the (falling film) pre-evaporator 12 and enters the liquor sump. The pre-evaporator 12 operates on the vapor compression cycle using a first turbo fan 13 to boost the (suction to discharge) vapor pressure. The heating steam from the turbo fan 13 discharge enters at the bottom of the pre-evaporator 12 heating elements.

The liquor to be concentrated is distributed with a low head circulation pump 31, which pumps liquor from the bottom of the vessel 12 to the liquor distribution system located at the top of the vessel 12. The liquor then free flows down the outside of the heating elements 62.

Evaporation of the water in the liquor from line 10 is accomplished by the heating steam condensing on the inside of the plates of element 62 and transferring heat through the heating surface to the liquor film on the outside of the heating elements 62. Because the pressure on the liquor side of the heating elements 62 is maintained below that of the heating steam side, the liquor film boils and releases water vapor.

The vapor evolved from the boiling liquor film escapes from between the parallel heating elements and then flows upwards in the free vapor space 25 created between the vessel 12 wall and the heating element 62 bundles. Because the vapor escapes immediately upon generation, there is minimal interference between the escaping vapor and the falling liquor film. The vapor then passes through a conventional vane type impingement separator (not shown) and exits the vessel 12 where it travels through vapor ducting to the suction side of the turbo fan 13 in line 70. After compression, the discharged vapor from the turbo fan 13 enters the heating elements 62 where it becomes the motive steam for evaporation. Normally, approximately 20% of the incoming steam to the pre-evaporator 12 vents through the heating surface of elements 62 to a second smaller turbo fan 14; however, this percentage can be varied to account for differences in the required stripper 18 design capacity, or the like. The smaller fan 14 boosts the pressure of the vent vapor so that it can be used to drive the falling film reboiler 19.

In a representative (only) example, the pre-evaporator 12 performs approximately 270,000 lb/hr of evaporation while concentrating the weak liquor in line 11 from 16% to 18.8% dry solids. Since the pre-evaporator 12 operates at a vapor temperature close to the incoming liquor, neither a feed pre-heater nor product cooler is required.

The stripping column 18 may be designed to process e.g. 550 gpm of foul condensates. This includes 430 gpm of foul condensate from the pulp mill. The remainder of foul condensate is internally generated within the system illustrated in FIG. 1. The stripper 18 is driven by vapor generated on the low pressure side of the reboiler 19. The reboiler 19 also preferably utilizes Ahlstrom dimpled plate heating elements 63 (although other conventional, e.g. tubular, heating surfaces may be utilized). As mentioned above, the motive steam for the reboiler 19 is vapor discharged from the small turbo fan 14. This vapor condenses inside the heating elements 63. The condensate formed is led in line 75 to stripping column 18. A portion of the stripped condensate in line 61, from the stripping column 18, is circulated over the outside of the reboiler heating elements 63. The boiled off vapor in line 69 drives the stripping column 18.

Vapor from the stripping column 18, in line 73, is condensed in a dedicated section of the heating surface of elements 62 located in the pre-evaporator 12. This heating section is called a "reflux condenser". The condensate formed in the section is led in line 64 to the level tank 20 (called "reflux tank) and pumped to the rectifying section of the stripping column 18 by the pump 41. Vapor vented through the reflux condenser enters the trim condenser 16, which controls the final stripper off-gas concentration. In order to transport the off-gas to the burners 67, a small steam ejector 17 is used to boost the off-gas pressure.

A "dedicated section of the heating surface" located in the pre-evaporator means that a portion of the heating surface has its own vapor inlet, and condensate and vent outlet connections. This way part of the heating surface is heated by a different heat (vapor) source than the rest of the heating surface. For example, in a vessel with two separate sections there are two vapor inlet connections, and two outlet connections for vent and two for condensate. The separate heating surface sections 62, 66 are still located inside the single evaporator body 12. In the flowsheet of FIG. 1, part (66) of the heating surface is heated by vapors from the larger vapor compression fan 13, while part (62) of the heating surface receives the heating vapor from the stripper 18.

Figure 2:
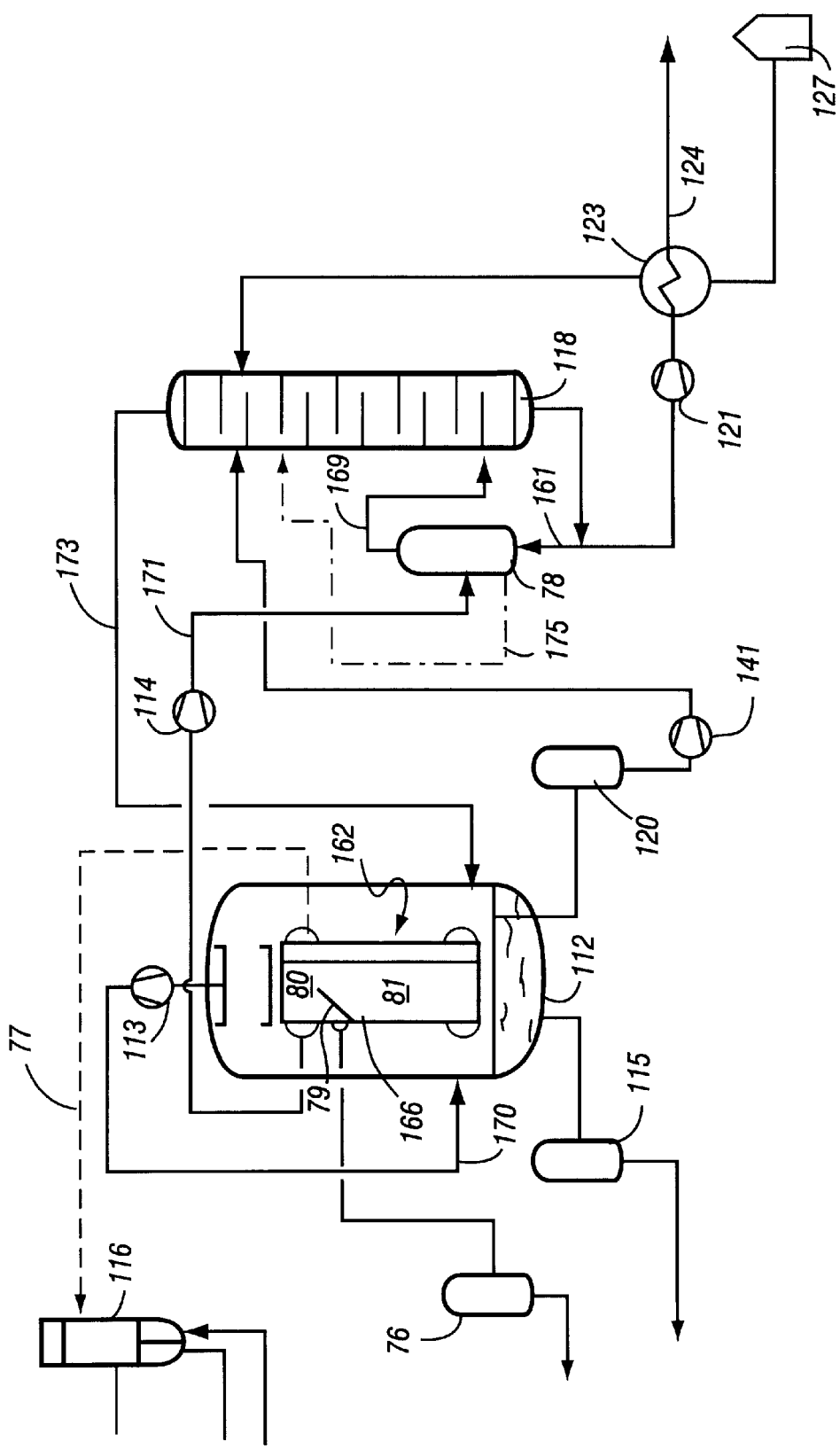
FIG. 2 shows a simplified, schematic, version of a system for practicing a method according to the invention, and with the black liquor lines removed for clarity of illustration.

The invention thus provides (or consists essentially of) an integrated VCE (vapor compression) pre-evaporator and condensate stripper, a simplified form of which is illustrated in FIG. 2. In FIG. 2 components comparable to those in FIG. 1 are shown by the same reference numeral only preceded by a "1"; no black liquor lines, or the like, are shown in FIG. 2 for clarity of illustration. In this a stripper reboiler of the kettle type 78 may be provided instead of the reboiler 19. In this embodiment condensates are split into a relatively clean condensate stream and a foul condensate by partitioning the heat exchange elements. (U.S. Pat. No. 4,878,535 discloses such a construction.) The inside of the plate heat exchange element 166, into which vapor in line 170 is fed as heating medium, is divided by means of an inclined partition wall 79 into an upper compartment 80 and a lower compartment 81. Vapor is fed into the lower compartment 81, in which the more easily condensed compounds, such as water vapor, are condensed, and the condensate formed in this compartment is relatively clean water, which nevertheless contains some methanol. This condensate is discharged to the tank 115 and can be used as such, e.g., in washing pulp, in cases where this condensate is considered as having sufficient purity. From the lower compartment 81, the vapor flows into the upper compartment 80, thus causing the vapor in the upper compartment to contain a larger percentage of volatile impurities, so that a foul condensate requiring cleaning is formed. The foul condensate is discharged from the pre-evaporator to a tank 75, which is a foul condensate pump out tank, the liquid from which will eventually go to the stripper 118. This gives the possibility to maintain a low methanol content in the clean fraction even at lower venting rates. This application can be used when less steam is needed to the reboiler/stripper e.g. with low external flow condensate flows. A line 77 is a methanol/NC gas discharge line through which the vent vapor from the evaporator 12 is led to a condenser 116 and a further treatment, such as a thermal destruct unit.

One representative (only) example of a design of the system is as follows:

| Design Parameter | Value |
|---|---|
| Feed Liquor to Pre-Evap:(10) | |
| Flow Rate (lb/hr) | 1,801,600 |
| Concentration (% TDS) | 16.0 |
| Temperature (EF) | 189 |
| Product Liquor from Pre-Evap (12) | |
| Flow Rate (lb/hr) | 1,531,756 |
| Concentration (% TDS) | 18.8 |
| Temperature (EF) | 190 |
| Pre-Evap. Evaporation Rate (lb/hr) | 269,844 |

-continued

| Design Parameter | | Value |
| --- | --- | --- |
| Fan Power | | |
| No. 1 HP (Installed) | [13] | 2,800 |
| No. 1 BHP | [13] | 2,545 |
| No. 2 HP (Installed) | [14] | 500 |
| No. 2 BHP | [14] | 454 |

In one numerical example according to the present invention, the total MeOH produced from pulping is split to about 60% in the condensate from the pulping operation and 40% in the evaporator operation. By evaporating 10–15% of the weak liquor, 65% of this 40% will be released and captured. Further 100% of the 60% from the pulping is collected together with some smaller streams of condensate from NCG and turpentine collection systems. All of this [0.65×0.40+1.0×0.6=0.86] is stripped in an integral stripper plant 18 removing and concentrating 92% of the HAP's for further treatment in a thermal oxidation unit 67. The operation will also add about 10–15% to the overall evaporation capacity.

The alternative to the invention is to collect selected streams of condensate in the existing evaporator train by selective condensation through external heat sinks. This is complicated and costly, and may involve adding integrated equipment requiring piping and instrument work. Further, the collected streams of condensate will need further treatment by stripping and the overhead vapor from the stripper, which will account for a substantial addition of waste steam, needs to be integrated for energy cascading to conserve energy.

Advantages of the assembly of the invention include:

Vapor recompression evaporator 12, 112 with condensate segregation effectively separates MeOH from the feed liquor, to achieve efficiency above Cluster Rule requirements;

Stripper 18, 118 integrated into the system, sized to handle all or part of the whole pulp mill requirement;

All motive steam/vapor for the system coming from the evaporated liquor in VCE (Vapor Compression Evaporator, having fans 13, 113,14,114) principle. The system uses at least one extra compressor (fans 14,114) to increase the stripper operating pressure and temperature, thus enabling to recover the heat in a separate section of the evaporator heating surface. The big benefit is that this way one does not need to bring in steam for constant energy supply, rather just for startup heating and possibly some for the compressor seals.

Extremely easy to integrate into existing equipment, only lines for liquids and electric cables required. Relocation can be freely chosen in the pulp mill; and The entire main assembly components (12, 18, 19, 13, 14, and 16) can be skid-mounted or otherwise pre-assembled.

According to one aspect of the invention, there is provided a method of heating cellulose pulp mill condensates having an MeOH content using a pre-evaporator 12 and a steam stripper 18, comprising (or consisting essentially of):

a. Collecting a first feed liquor stream (10) having at least 50% of the pulp mill MeOH (methanol);

b. Feeding the first feed liquor stream to the pre-evaporator (12);

c. Evaporating the liquor in the evaporator (12) to produce a first vapor line 70 containing at least 40%, but preferably about 65%, of the at least 50% of the pulp mill MeOH;

d. Using a compressor 13 to increase the vapor pressure of the vapor in line 70 to be used as condensing heating media for the evaporation in evaporator 12;

e. Venting a portion (about 10–20%) of the vapor entering into the heating element 66 through the upper part of the heating element 66 to the line 71 [the vented vapor from the heating element 66 will contain about 80% of the 65% of the 50% of the total pulp mill MeOH];

f. Compressing the vented vapor from line 71 in compressor 14 to increase the vapor pressure to be used as heating media in the reboiler 19.

g. Condensing the compressed vapor containing 0.65× 0.8×0.4=0.208 of the total MeOH on the inside of heating element 63 of the reboiler 19 while evaporating already stripped condensate fed through line 61 to the reboiler 19 so that it flows through vapor line 69 to the stripper 18;

h. Returning condensate from heating element 62 to the top of the stripper column 18 as rectification;

i. Causing vapor in line 69 to enter the stripper column 18 below the last column tray and to flow upwards countercurrent to the condensate entering via line 72 and the condensate from the heating element 63, producing an MeOH rich vapor leaving the stripper column 18 via line 73.

j. Causing the vapor in line 73 to enter the heating element 62 and condense while evaporating black feed liquor from line 10;

k. Causing the vapor generated from heating element 62 to flow jointly with vapor generated from heating element 66 via the vapor space 28 to the compressor 13 to complete the cycle;

l. Venting a portion of the vapor entering element 62 via the lower element portion to the condenser 16 via ejector 17;

m. Mixing the condensate produced in condenser 16 with the condensate from heating elements 62 and returning it to the top of the stripper column 18 as rectification; and n. Leading the MeOH-rich (Ca 40–50% by weight) vapor in line 74 from condenser 16 to the thermal destruct unit 67 to effect destruction thereof or to a methanol liquefaction plant.

In the method described above, preferably the first liquor stream is black liquor substantially directly from the digester (i.e. not evaporated elsewhere first). The method may also comprise the further step of feeding a portion of foul condensate from the pulp mill to the stripper (18). A wide variety of other modifications are also possible within the scope of the invention, which is not limited to the embodiments illustrated and described.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of treating cellulose pulp mill condensates having a MeOH content using an evaporator and a steam stripper having a reboiler, comprising:

(a) collecting a feed liquor stream having at least 50% of the pulp mill MeOH;

(b) feeding the feed liquor stream to the evaporator having at least two heating element sections separated on a motive steam side;

(c) evaporating the liquor stream in the evaporator to produce a vapor containing at least 40% of the at least 50% of the pulp mill MeOH;

(d) compressing the vapor from (c) to increase the vapor pressure;

(e) using the vapor from (d) as condensing heating media in (c) for the evaporation in a first heating element section of the evaporator and venting a portion of the vapor through the first heating element section;

(f) compressing the vented portion of the vapor from the first heating elements portion of the evaporator from (e) to increase the vapor pressure to be used as heating media in the reboiler;

(g) condensing the compressed vapor from (f) in the reboiler while evaporating already stripped condensate fed to the reboiler so that vapor formed in the reboiler flows to the steam stripper, (h) feeding the condensate from the reboiler and a condensate from the evaporator to the steam stripper;

(i) causing vapor from (g) to enter the steam stripper and to flow upward countercurrent to the condensates from (h), producing an MeOH rich vapor leaving the steam stripper;

(j) causing the MeOH rich vapor to enter a second heating element section of the evaporator and condense while evaporating the liquor stream in (c) producing the condensate entering the steam stripper in (h); and (k) venting a portion of the MeOH rich vapor entering the heating element section in (j).

2. A method as recited in claim 1 wherein the liquor stream is black liquor obtained substantially directly from a digester of the pulp mill, and (c) is practiced in a pre-evaporator.

3. A method as recited in claim 2 further comprising (l) leading the vented portion vented portion of MeOH-rich vapor from (k) to a thermal destruct unit or to a methanol liquefaction plant.

4. A method as recited in claim 2 further comprising (l), before (i), feeding foul condensate from the pulp mill to the steam stripper.

5. A method as recited in claim 2 wherein (c) is practiced to produce a vapor containing at least 65% of the at least 50% of the pulp mill MeOH.

6. A method as recited in claim 3 wherein (a) is practiced using as the feed liquor stream a foul condensate that comes from condensation of digester blow-off vapor, turpentine underflow, and a non-condensable gas collection system.

7. A method as recited in claim 3 further comprising (m), before (i), feeding foul condensate from the pulp mill to the steam stripper.

8. A method as recited in claim 1 wherein (a) is practiced using as the feed liquor stream a foul condensate that comes from condensation of digester blow-off vapor, turpentine underflow, and a non-condensable gas collection system.

* * * * *